United States Patent [19]

Suzuki et al.

[11] 4,188,352
[45] Feb. 12, 1980

[54] ELASTOMERIC COMPOSITION COMPRISING FLUOROELASTOMER AND EPICHOLOROHYDRIN ELASTOMER

[75] Inventors: Takeshi Suzuki, Nagaokakyo; Yasuyoshi Furukawa, Ikedaminamimachi; Masayasu Tomoda, Ootsu; Yutaka Ueta, Osaka, all of Japan

[73] Assignee: Daikin Kogyo Co., Ltd., Osaka, Japan

[21] Appl. No.: 974,239

[22] Filed: Dec. 29, 1978

[30] Foreign Application Priority Data

Dec. 30, 1977 [JP] Japan .................... 52/160343

[51] Int. Cl.$^2$ .................. C08L 27/14; C08L 27/16; C08L 27/20
[52] U.S. Cl. .................. 525/187; 260/42.49; 260/23 EP

[58] Field of Search ......................... 260/900

[56] References Cited

U.S. PATENT DOCUMENTS

| 3,424,818 | 1/1969 | Hawley et al. ............ 260/836 |
| 4,141,874 | 2/1979 | Oka et al. ............ 260/900 |

*Primary Examiner*—Carman J. Seccuro
*Attorney, Agent, or Firm*—Stevens, Davis, Miller & Mosher

[57] ABSTRACT

An elastomeric composition comprising a fluoroelastomer, an epichlorohydrin elastomer, an acid-acceptor, a curing accelerator and a fluorine-containing polyhydroxy compound, which is handled without any difficulty and can afford, on crosslinking, a rubbery material excellent in physical and chemical properties at a wide range of temperatures.

13 Claims, No Drawings

ELASTOMERIC COMPOSITION COMPRISING FLUOROELASTOMER AND EPICHOLOROHYDRIN ELASTOMER

The present invention relates to an elastomeric composition, particularly to an elastomeric composition which comprises a fluoroelastomer and an epichlorohydrin elastomer.

Since fluoroelastomers possess excellent physical and chemical properties (e.g. heat resistance, chemical resistance, oil resistance, solvent resistance) at high temperatures, they are widely used in various fields as sealing materials (e.g. gaskets, packings, hoses, diaphragms, sheets, etc. However, their characteristics at low temperatures are not satisfactory: softness being lost at temperatures around $-20°$ C. and rubbery elasticity disappearing at lower temperatures.

On the other hand, epichlorohydrin elastomers, which are relatively cheep, have considerable heat resistance and oil resistance and are excellent in physical and chemical properties at low temperatures. However, their heat resistance and oil resistance are inferior to those of fluoroelastomers. In addition, conventional compositions comprising epichlorohydrin elastomers could be handled only with great difficulty, since they produce adhesion on roll processing and corrosion of molds at press vulcanization.

As the result of the extensive study, it has now been found that an elastomeric composition comprising a fluoroelastomer and an epichlorohydrin elastomer together with an acid-acceptor, a curing accelerator and a fluorine-containing polyhydroxy compound can afford, on crosslinking, a rubbery material excellent in physical and chemical properties at a wide range of temperatures without any difficulty in handling.

Accordingly, a basic object of the present invention is to provide an elastomeric composition comprising a fluoroelastomer and an epichlorohydrin elastomer having excellent physical and chemical properties originated therefrom without any disadvantageous characteristics inherent thereto. Another object of this invention is to provide an elastomeric composition comprising a fluoroelastomer and an epichlorohydrin elastomer which can afford a rubbery material excellent in heat resistance, low temperature characteristics and oil resistance with easy handling. A further object of the invention is to provide an elastomeric composition having a good flowing property for easy processing, which can be crosslinked to give a rubbery material excellent in mechanical properties, compression set, anti-oxidation, etc.

The elastomeric composition of the present invention comprises as the essential components a fluoroelastomer, an epichlorohydrin elastomer, an acid-acceptor, a curing accelerator and a fluorine-containing polyhydroxy compound.

The fluoroelastomer to be advantageously used in the invention is a highly fluorinated copolymer with elasticity. Examples thereof are copolymers of vinylidene fluoride with one or more of other fluorinated olefins such as hexafluoropropene, pentafluoropropene, trifluoroethylene, trifluorochloroethylene, tetrafluoroethylene, vinyl fluoride, perfluoromethyl vinyl ether and perfluoropropyl vinyl ether. Among them, vinylidene fluoride-hexafluoropropene copolymer and vinylidene fluoride-tetrafluoroethylene-hexafluoropropene copolymer are particularly preferable.

As the epichlorohydrin elastomer, there may be employed homopolymer of epichlorohydrin or copolymer of epichlorohydrin with one or more of other polymerizable monomers such as ethylene oxide, provided that the epichlorohydrin units are not less than 50 mol %.

As the acid-acceptor, oxides and hydroxides of metals such as magnesium, lead, calcium and zinc are exemplified.

As the curing accelerator, the following compounds are utilizable:

(a) Amines represented by one of the formulae:

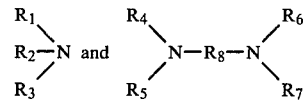

wherein $R_1$, $R_2$ and $R_3$ are each an alkyl group having 1 to 20 carbon atoms, or one of them may be a cycloalkyl group having 5 or 6 carbon atoms, or two of them may be bonded together to make a nitrogen-containing saturated ring, $R_4$, $R_5$, $R_6$ and $R_7$ are each an alkyl group having 1 to 6 carbon atoms, or $R_4$ and $R_6$ and/or $R_5$ and $R_7$ may be linked to make each a nitrogen-containing saturated ring, and $R_8$ is an alkylene group having 1 to 21 carbon atoms, and their salts with organic or inorganic acids;

(b) Cyclic amines represented by one of the formulae:

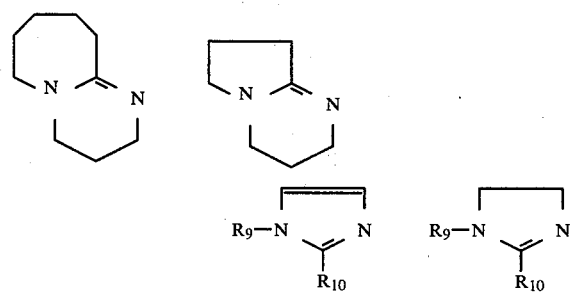

wherein $R_9$ is a hydrogen atom, an alkyl group having 1 to 20 carbon atoms or an aralkyl group having 7 to 20 carbon atoms and $R_{10}$ is an alkyl group having 1 to 20 carbon atoms or an aryl group having 6 to 12 carbon atoms, and their salts with organic or inorganic acids;

(c) Phosphorous compounds represented by the formula:

wherein X, Y and Z are each an alkyl group having 1 to 20 carbon atoms or an aryl group having 6 to 12 carbon atoms.

Examples of the fluorine-containing polyhydroxy compound are 2,2-bis(4-hydroxyphenyl)perfluoropropane (bisphenol AF), 2,2-bis(4-hydroxyphenyl)tetrafluorodicyclopropane, 2-(4'-hydroxyphenyl)-1,1,1,3,3,3-hexafluoro-2-propanol, $HOCH_2(CF_2)_3CH_2OH$, $HOCH_2CF_2CFH(CF_2)_3CFHCF_2CH_2OH$, $HOCH_2CH_2CH_2(CF_2)_3CH_2CH_2CH_2OH$ and $HOCH_2CF_2CH_2(CF_2)_3CH_2CF_2CH_2OH$, and their alkali metal and alkaline earth metal salts. Among them, bisphenol AF is the most preferable.

The proportion of the fluoroelastomer and the epichlorohydrin elastomer to be used may be 5:95 to 95:5 by weight. When the proportion of the fluoroelastomer is smaller than the lower limit, the improvement in thermal resistance, oil resistance and anti-oxidation may not be attained. Further, the handling will remain difficult. When it is larger than the upper limit, the low temperature characteristics and the flowing property at processing tend to be not sufficiently improved.

The amount of the acid-acceptor may be usually from 1 to 40 parts by weight, particularly from 3 to 15 parts by weight, to 100 parts by weight of the elastomers. The curing accelerator is used normally in an amount of from 0.1 to 10 parts by weight, preferably from 0.3 to 2 parts by weight, to 100 parts by weight of the elastomers. The fluorine-containing polyhydroxy compound is used ordinarily in an amount of from 0.5 to 10 parts by weight, preferably from 0.5 to 5 parts by weight, to 100 parts by weight of the elastomers.

In addition to the above essential components, the composition of the invention may include optionally an inorganic filler such as carbon black, silica, clay or talc. It may also include suitable organic additives for improvement of the plasticity and the thermal resistance.

The composition of the invention can be prepared by a conventional mixing procedure for obtaining a uniform composition. It is subjected to crosslinking by a conventional procedure. When desired, it may be employed in a solution form. For example, its solution in a ketone such as acetone may be applied on the surface of paper, fiber, cloth, sheet, film or the like and then subjected to crosslinking. The composition of the invention is also utilizable as a paint, an adhesive or a binding agent in addition to the said uses.

The present invention will be explained further in detail by the following Examples and Comparative Examples.

EXAMPLES 1 to 4

Vinylidene fluoride-hexafluoropropene copolymer (intrinsic viscosity, 0.78 (determined at 25° C. in methyl ethyl ketone) was kneaded on a roll for 5 minutes, and carbon black, calcium hydroxide and bisphenol AF were incorporated therein to make a base composition. Into the base composition, magnesium oxide, red lead, triethylenediamine and/or an anti-oxidant "Sumilizer MB" (manufactured by Sumitomo Chemical Co., Ltd.) were incorporated, and then epichlorohydrin-ethylene oxide copolymer "Herculor 200C" (manufactured by Hercules Inc.) was added thereto. The resultant elastomeric composition showed a good blending property with remarkably reduced adhesion.

By the use of the elastomeric composition as prepared above, there was made a sheet, which was subjected to curing at 150° C. for 30 minutes in case of press vulcanization or at 150° C. for 3 hours in case of oven vulcanization and testing for evaluation of the physical properties according to the Japanese Industrial Standard (JIS K 6301. The results are shown in Table 1.

COMPARATIVE EXAMPLES 1 to 3

As in Examples 1 to 4, there was prepared an elastomeric composition but using solely the vinylidene fluoride-hexafluoropropene copolymer or the epichlorohydrinethylene oxide copolymer as the elastomeric component.

By the use of the elastomeric composition as prepared above, there was made a sheet, which was subjected to curing for vulcanization and testing for evaluation of the physical properties. The results are shown in Table 1.

Table 1

| Item | Specimen | Example 1 | Example 2 | Example 3 | Example 4 | Comparative Example 1 | Comparative Example 2 | Comparative Example 3 |
|---|---|---|---|---|---|---|---|---|
| Amount (parts by weight) | Fluoroelastomer | 70 | 60 | 50 | 50 | 100 | | |
| | Epichlorohydrin elastomer | 30 | 40 | 50 | 50 | | 100 | 100 |
| | Carbon black | SRF 10 | SRF 10 | SRF 10 | SEF 10 | SRF 10 | SRF 50 | SRF 20 |
| | Calcium hydroxide | 6 | 5 | 5 | 5 | 5 | | 5 |
| | Bisphenol AF | 2.5 | 2.5 | 2.5 | 1.5 | 2 | | 3 |
| | Magnesium oxide | 5 | 5 | 5 | | 5 | | 5 |
| | Red lead | | | | 8 | | 8 | |
| | Triethylenediamine | 0.8 | 0.8 | 0.8 | 0.8 | 0.5 | | 1.0 |
| | Sumilizer MB | | | | | | 1.5 | |
| | 2-Mercaptoimidazoline | | | | | | 1.5 | |
| | Calcium stearate | | | | | | 2 | |
| | Azelaic acid | | | | | | 4 | |
| Normal state | 100% modulus (kg/cm$^2$) | 50 | 45 | 36 | 55 | 91 | 89 | 49 |
| | Tensile strength (kg/cm$^2$) | 153 | 145 | 140 | 117 | 171 | 136 | 102 |
| | Elongation (%) | 290 | 310 | 340 | 220 | 200 | 160 | 230 |
| | Hardness (JIS, HS) | 72 | 70 | 66 | 75 | 79 | 84 | 70 |
| Aging (150° C. × 7 days) | Tensile strength (kg/cm$^2$) | 116 | 100 | 79 | 95 | 181 | 76 | 10 |
| | Elongation (%) | 250 | 240 | 200 | 210 | 90 | 50 | 100 |
| | Hardness (JIS, HS) | 80 | 75 | 71 | 73 | 84 | 92 | 60 |
| Low temperature characteristics | T 50 (°C.) (Gehmann's torsion test: torsion wire, 0.5 g.cm; isopropanol/dry ice bath) | −24.2 | −29.3 | −35.2 | −34.8 | −19.0 | −40.5 | −39.0 |

Table 1-continued

| Item | Specimen | Example 1 | Example 2 | Example 3 | Example 4 | Comparative Example 1 | Comparative Example 2 | Comparative Example 3 |
|---|---|---|---|---|---|---|---|---|
| Oil resistance | Increase of volume (%) (After immersion into isooctane-toluene (70:30) mixture at 40° C. for 70 hours | 5.1 | 6.7 | 8.0 | 7.5 | 4.7 | 12.5 | 11.8 |
| Corrosion of mold | | None | None | None | None | None | Found | Slightly found |
| Comparison of minimum value of viscosity of blended composition by curastometer (160° C.); ratio to value of Comparative Example 1 | | 0.51 | 0.46 | 0.40 | 0.38 | 1.0 | 0.98 | 0.55 |

As understood from the above results, the composition of the invention is improved in mold-corrosion and roll processability and excellent in various physical properties such as thermal resistance, oil resistance and low temperature characteristics.

EXAMPLES 5 to 8

Vinylidene fluoride-hexafluoropropene copolymer (intrinsic viscosity, 0.78 (determined at 25° C. in methyl ethyl ketone) was kneaded on a roll for 5 minutes, and carbon black, calcium hydroxide and $HOCH_2CF_2CFH(CF_2)_4$—$CFHCF_2CH_2OH$ were incorporated therein to make a base composition. Into the base composition, magnesium oxide, red lead, triethylenediamine and/or 1,8-diazabicyclo[5.4.0]undecene-7 (DBU) were incorporated, and then epichlorohydrin-ethylene oxide copolymer "Herculor 200C" (manufactured by Hercules Inc.) was added thereto. The resultant elastomeric composition showed a good blending property with remarkably reduced adhesion.

By the use of the elastomeric composition as prepared above, there was made a sheet, which was subjected to curing at 150° C. for 30 minutes in case of press vulcanization or at 150° C. for 3 hours in case of oven vulcanization and testing for evaluation of the physical properties according to JIS K 6301. The results are shown in Table 2.

Table 2

| Item | Specimen | Example 5 | Example 6 | Example 7 | Example 8 |
|---|---|---|---|---|---|
| Amount (parts by weight) | Fluoroelastomer | 50 | 60 | 70 | 60 |
| | Epichlorohydrin elastomer | 50 | 40 | 30 | 40 |
| | SRF carbon black | 10 | 10 | 10 | 10 |
| | Calcium hydroxide | 3 | 3 | 3 | 3 |
| | Magnesium oxide | 5 | 5 | 5 | — |
| | Red lead | | | | 8 |
| | DBU | 0.7 | 0.6 | 0.5 | |
| | Triethylenediamine | | | | 0.8 |
| | $HOCH_2CF_2CFH(CF_2)_4CFH$—$CF_2CH_2OH$ | 2 | 2 | 2 | 2 |
| Normal state | 100% modulus (kg/cm$^2$) | 40 | 38 | 36 | 45 |
| | Tensile strength (kg/cm$^2$) | 116 | 118 | 120 | 142 |
| | Elongation (%) | 230 | 240 | 240 | 260 |
| | Hardness (JIS, HS) | 70 | 69 | 68 | 73 |
| Aging (150° C. × 7 days) | Tensile strength (kg/cm$^2$) | 106 | 110 | 112 | 125 |
| | Elongation (%) | 230 | 230 | 240 | 260 |
| | Hardness (JIS, HS) | 70 | 70 | 70 | 72 |
| Low temperature characteristics | T 50 (°C.) (Gehmann's torsion test: torsion wire, 0.5 g.cm; isopropanol/dry ice bath) | −35.5 | −29.2 | −24.5 | −29.6 |
| Corrosion of mold | | None | None | None | None |

What is claimed is:

1. An elastomeric composition which comprises a fluoroelastomer, an epichlorohydrin elastomer, an acid-acceptor, a curing accelerator and a fluorine-containing polyhydroxy compound wherein the proportion of the fluoroelastomer and the epichlorohydrin elastomer is from 95:5 to 5:95 by weight.

2. The elastomeric composition according to claim 1, wherein the fluoroelastomer is a copolymer of vinylidene fluoride with at least one fluorinated olefin other than vinylidene fluoride.

3. The elastomeric composition according to claim 2, wherein the fluorinated olefin is hexafluoropropene, pentafluoropropene, trifluoroethylene, trifluorochloroethylene, tetrafluoroethylene, vinyl fluoride, perfluoromethyl vinyl ether or perfluoropropyl vinyl ether.

4. The elastomeric composition according to claim 2, wherein the fluoroelastomer is vinylidene fluoride-hexafluoropropene copolymer or vinylidene fluoride-tetrafluoroethylene-hexafluoropropene copolymer.

5. The elastomeric composition according to claim 1, wherein the epichlorohydrin elastomer is homopolymer of epichlorohydrin or copolymer of epichlorohydrin with at least one polymerizable monomer other than epichlorohydrin.

6. The elastomeric composition according to claim 5, wherein the polymerizable monomer is ethylene oxide.

7. The elastomeric composition according to claim 1, wherein the acid-acceptor is an oxide or hydroxide of magnesium, lead, calcium or zinc.

8. The elastomeric composition according to claim 1, wherein the curing accelerator is at least one selected from the group consisting of (a) amines of the formulae:

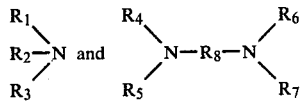

wherein $R_1$, $R_2$ and $R_3$ are each an alkyl group having 1 to 20 carbon atoms, or one of them may be a cycloalkyl group having 5 or 6 carbon atoms, or two of them may be bonded together to make a nitrogen-containing saturated ring, $R_4$, $R_5$, $R_6$ and $R_7$ are each an alkyl group having 1 to 6 carbon atoms, or $R_4$ and $R_6$ and/or $R_5$ and $R_7$ may be linked to make each a nitrogen-containing saturated ring, and $R_8$ is an alkylene group having 1 to 21 carbon atoms, and their salts with organic or inorganic acid, (b) cyclic amines of the formulae:

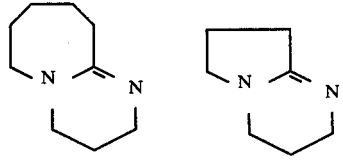

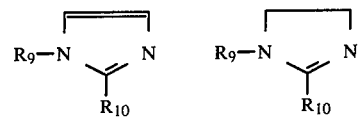

wherein $R_9$ is a hydrogen atom, an alkyl group having 1 to 20 carbon atoms or an aralkyl group having 7 to 20 carbon atoms and $R_{10}$ is an alkyl group having 1 to 20 carbon atoms or an aryl group having 6 to 12 carbon atoms, and their salts with organic or inorganic acids, and (c) phosphorus compounds of the formula:

wherein X, Y and Z are each an alkyl group having 1 to 20 carbon atoms or an aryl group having 6 to 12 carbon atoms.

9. The elastomeric composition according to claim 1, wherein the fluorine-containing polyhydroxy compound is 2,2-bis(4-hydroxyphenyl)perfluoropropane, 2,2-bis(4-hydroxyphenyl)tetrafluorodicyclopropane, 2-(4'-hydroxyphenyl)-1,1,1,3,3,3-hexafluoro-2-propanol, $HOCH_2(CF_2)_3CH_2OH$, $HOCH_2CF_2CFH(CF_2)_3CFHCF_2CH_2OH$, $HOCH_2CH_2CH_2(CF_2)_3CH_2CH_2CH_2OH$ or $HOCH_2CF_2CH_2(CF_2)_3CH_2CF_2CH_2OH$, or its alkali metal or alkaline earth metal salt.

10. The elastomeric composition according to claim 9, wherein the fluorine-containing polyhydroxy compound is 2,2-bis(4-hydroxyphenyl)perfluoropropane.

11. The elastomeric composition according to claim 1, wherein the acid-acceptor is included in an amount of from 1 to 40 parts by weight to 100 parts by weight of the elastomers.

12. The elastomeric composition according to claim 1, wherein the curing accelerator is included in an amount of from 0.1 to 10 parts by weight to 100 parts by weight of the elastomers.

13. The elastomeric composition according to claim 1, wherein the fluorine-containing polyhydroxy compound is included in an amount of from 0.5 to 10 parts by weight to 100 parts by weight of the elastomers.

* * * * *